(12) United States Patent
Caldwell et al.

(10) Patent No.: US 10,958,738 B2
(45) Date of Patent: Mar. 23, 2021

(54) TIMER SERVICES

(71) Applicant: Metaswitch Networks Ltd., Enfield (GB)

(72) Inventors: Andrew Caldwell, Enfield (GB); Matthew Williams, Enfield (GB); Michael Jeffrey Evans, Enfield (GB)

(73) Assignee: Metaswitch Network Ltd., Enfield (GB)

( * ) Notice: Subject to any disclaimer, the term of this patent is extended or adjusted under 35 U.S.C. 154(b) by 201 days.

(21) Appl. No.: 16/275,151

(22) Filed: Feb. 13, 2019

(65) Prior Publication Data

US 2019/0182339 A1 Jun. 13, 2019

Related U.S. Application Data

(63) Continuation of application No. 14/604,473, filed on Jan. 23, 2015, now abandoned.

(30) Foreign Application Priority Data

Jan. 24, 2014 (GB) .................................. 1401252.0
Apr. 10, 2014 (GB) .................................. 1406517.1

(51) Int. Cl.
*G06F 15/16* (2006.01)
*H04L 29/08* (2006.01)
*H04L 29/06* (2006.01)

(52) U.S. Cl.
CPC .......... *H04L 67/16* (2013.01); *H04L 67/1095* (2013.01); *H04L 67/28* (2013.01); *H04L 69/28* (2013.01)

(58) Field of Classification Search
CPC ..... H04L 67/16; H04L 67/1095; H04L 67/28; H04L 69/28

(Continued)

(56) References Cited

U.S. PATENT DOCUMENTS 7,526,551 B1 * 4/2009 Islam .................. G06F 11/1482
370/216
7,680,923 B1 * 3/2010 Allan .................. H04L 41/0866
709/224

(Continued)

FOREIGN PATENT DOCUMENTS

| WO | 2008122649 A2 | 10/2008 |
| WO | 2009135052 A2 | 11/2009 |
| WO | 2012151430 A1 | 11/2012 |

OTHER PUBLICATIONS

United Kingdom Search Report dated Jul. 1, 2014 for United Kingdom Patent Application No. GB 1401252.0.

(Continued)

*Primary Examiner* — Hannah S Wang
(74) *Attorney, Agent, or Firm* — EIP US LLP

(57) ABSTRACT

Measures for providing timer services in a network including a cluster of nodes responsible for providing timer services to clients. At a given node in the cluster, a request to provide a timer is received from a client. Configuration of a primary replica of the requested timer on a first node in the cluster to pop after a first time has elapsed is initiated. A first timer replication message is transmitted to a second node in the cluster, the first timer replication message indicating that the second node should configure a first backup replica of the requested timer. A second timer replication message is transmitted to a third node in the cluster, the second timer replication message indicating that the third node should configure a second backup replica of the requested timer. Popping of the primary, first backup or second backup timer replicas includes initiating callback of a given client.

23 Claims, 6 Drawing Sheets

(58) Field of Classification Search
USPC .......................................................... 709/202
See application file for complete search history.

(56) References Cited

U.S. PATENT DOCUMENTS

| | | | |
|---|---|---|---|
| 8,812,651 B1* | 8/2014 | Eriksen ................. | H04L 45/745 |
| | | | 709/224 |
| 9,100,274 B1 | 8/2015 | Ghosh | |
| 10,033,837 B1* | 7/2018 | Amdahl .................. | H04L 69/04 |
| 2008/0222154 A1* | 9/2008 | Harrington ......... | G06F 16/1834 |
| 2008/0244302 A1* | 10/2008 | Khatri ....................... | G06F 1/14 |
| | | | 713/502 |
| 2009/0006495 A1* | 1/2009 | Ramasubramanian ...................... | |
| | | | G06F 16/27 |
| 2009/0276658 A1 | 11/2009 | Lind et al. | |
| 2010/0322256 A1* | 12/2010 | Riley ..................... | H04L 45/64 |
| | | | 370/400 |
| 2011/0028116 A1 | 2/2011 | Blum et al. | |
| 2011/0055621 A1* | 3/2011 | Mandagere ......... | G06F 11/1435 |
| | | | 714/6.3 |
| 2011/0108619 A1 | 5/2011 | Udd | |
| 2011/0307447 A1* | 12/2011 | Sabaa ................ | G06F 16/24556 |
| | | | 707/637 |
| 2013/0132408 A1* | 5/2013 | Little .................. | G06F 16/2255 |
| | | | 707/754 |
| 2013/0287024 A1* | 10/2013 | Herberg ................ | H04L 47/323 |
| | | | 370/392 |
| 2013/0318051 A1* | 11/2013 | Kumar ................ | G06F 16/1748 |
| | | | 707/692 |

OTHER PUBLICATIONS

United Kingdom Search Report dated Oct. 20, 2014 for United Kingdom Patent Application No. GB 1406517.1.
United States Non-Final Office action dated Nov. 18, 2016 for U.S. Appl. No. 14/604,473.
United States Final Office action dated Apr. 5, 2017 for U.S. Appl. No. 14/604,473.
United States Non-Final Office action dated Feb. 7, 2018 for U.S. Appl. No. 14/604,473.
United States Final Office action dated Sep. 14, 2018 for U.S. Appl. No. 14/604,473.
Li et al., "Fault-Tolerant Cluster Management for Reliable High-Performance Computing", Concurrent Systems Laboratory, Computer Science Department, UCLA, Los Angeles, CA, Aug. 2001.
Chervenak et al., "The Globus Replica Location Service: Design and Experience", Parallel and Distributed Systems, IEEE Transactions on; vol. 20, Issue 9; Aug. 2008. http://ieeexplore.ieee.org/xpl/login.jsp?tp=&arnumber=4604659&url=http%3A%2F%2Fieeexplore.ieee.org%2Fxpls%2Fabs_all.jsp%3Farnumber%3D4604659.

* cited by examiner

TIMER SERVICES

CROSS-REFERENCE TO RELATED APPLICATIONS

This application is a continuation of U.S. application Ser. No. 14/604,473, filed Jan. 23, 2015, which claims priority under 35 U.S.C. § 119(a) to UK Patent Application No. GB1401252.0, filed on Jan. 24, 2014, and UK Patent Application No. GB1406517.1, filed on Apr. 10, 2014. Each of the above-referenced patent applications is incorporated by reference in its entirety.

BACKGROUND OF THE INVENTION

Field of the Invention

The present disclosure relates to timer services. In particular, but not exclusively, the present disclosure relates to providing timer services in a network.

Description of the Related Technology

It would be desirable to provide measures to trigger one or more work processes to be carried out on a recurring interval in a network in a way that is reliable and efficient. The work process(es) could be carried out for example in response to receipt of a request from a client to provide a timer service.

The measures should satisfy one or more of the following properties:

1. No single point of failure (i.e. redundant). This property suggests that a requesting client should preferably not be limited to talking to a single access point (in case that fails). This property suggests that more than one process (for example server node or suchlike) be responsible for handling the work (such as a given timer).
2. Support dynamic addition or removal of capacity with no loss of service.
3. Support a clustered client. For example, a client instance might request a work process (for example setting a timer), then die, but the work process should still be carried out (for example the timer should still be able to be popped on another instance of the client cluster).
4. Perform a work process within a given time window. For example, if a client asked for a timer to pop in n seconds, the timer should preferably pop within 2*n seconds (the closer to n the better).
5. No leak/loop of a recurring work process (such as a timer) forever. For example, even if a cancel request is lost due to an outage, the work process should stop itself after some time.
6. Only notify a client (or client cluster) once for a given work process such as a timer pop. It would be acceptable, in error cases, to generate multiple notifications, as long as it is possible to tell at a client that this has occurred.

SUMMARY

According to embodiments, there is a method of providing timer services in a network, the method comprising: at a given node in a cluster of network nodes which are responsible for providing timer services to clients in the network, receiving, from a client, a request to provide a timer; at the given node, initiating configuration of a primary replica of the requested timer on a first node in the cluster to pop after a first time has elapsed, the popping of the primary timer replica comprising initiating callback of a given client; at the given node, transmitting a first timer replication message to a second node in the cluster, the first timer replication message indicating that the second node should configure a first backup replica of the requested timer, the first timer replication message being operable to allow the second node to derive that it should configure the first backup replica of the requested timer to pop after the first time plus a first skew time have elapsed, the popping of the first backup timer replica comprising initiating callback of the given client; and at the given node, transmitting a second timer replication message to a third node in the cluster, the second timer replication message indicating that the third node should configure a second backup replica of the requested timer, the second timer replication message being operable to allow the third node to derive that it should configure the second backup replica of the requested timer to pop after the first time plus a second skew time have elapsed, the second skew time being greater than the first skew time, the popping of the second backup timer replica comprising initiating callback of the given client.

According to embodiments, there is a system for use in providing timer services in a network, the system comprising at least one memory including computer program code; and at least one processor in data communication with the at least one memory, wherein the at least one processor is configured to: at a given node in a cluster of network nodes which are responsible for providing timer services to clients in the network, receive, from a client, a request to provide a timer; at the given node, initiate configuration of a primary replica of the requested timer on a first node in the cluster to pop after a first time has elapsed, the popping of the primary timer replica comprising initiating callback of a given client; at the given node, transmit a first timer replication message to a second node in the cluster, the first timer replication message indicating that the second node should configure a first backup replica of the requested timer, the first timer replication message being operable to allow the second node to derive that it should configure the first backup replica of the requested timer to pop after the first time plus a first skew time have elapsed, the popping of the first backup timer replica comprising initiating callback of the given client; and at the given node, transmit a second timer replication message to a third node in the cluster, the second timer replication message indicating that the third node should configure a second backup replica of the requested timer, the second timer replication message being operable to allow the third node to derive that it should configure the second backup replica of the requested timer to pop after the first time plus a second skew time have elapsed, the second skew time being greater than the first skew time, the popping of the second backup timer replica comprising initiating callback of the given client.

According to embodiments, there is a non-transitory computer-readable storage medium comprising computer-executable instructions which, when executed by a processor, cause a computing device to perform a method of providing timer services in a network, the method comprising: at a given node in a cluster of network nodes which are responsible for providing timer services to clients in the network, receiving, from a client, a request to provide a timer; at the given node, initiating configuration of a primary replica of the requested timer on a first node in the cluster to pop after a first time has elapsed, the popping of the primary timer replica comprising initiating callback of a given client; at the given node, transmitting a first timer replication message to a second node in the cluster, the first timer replication message indicating that the second node should configure a first backup replica of the requested timer, the first timer replication message being operable to allow the second node to derive that it should configure the first backup replica of the requested timer to pop after the first time plus a first skew time have elapsed, the popping of the first backup timer replica comprising initiating callback of the given client; and the given node, transmitting a second timer replication message to a third node in the cluster, the second timer replication message indicating that the third node should configure a second backup replica of the requested timer, the second timer replication message being operable to allow the third node to derive that it should configure the second backup replica of the requested timer to pop after the first time plus a second skew time have elapsed, the second skew time being greater than the first skew time, the popping of the second backup timer replica comprising initiating callback of the given client.

According to embodiments, there is a method of identifying nodes in a network, the network comprising a cluster of nodes which are responsible for providing replicas of functions for clients in the network, the method comprising, at a given node in the cluster: receiving, from a client, a request to apply an update to a given function configured as replicas of the given function on a plurality of nodes in the cluster, the update request comprising an identifier for the given function, the given function identifier comprising information encoded using a probabilistic set, the information being associated with each of the nodes in the plurality of nodes on which the given function has been configured; decoding the encoded information to identify each of the nodes in the plurality of nodes on which respective replicas of the given function have been configured; and transmitting at least one replica function update message to one or more of the identified nodes to instruct update of their respective configured replicas of the given function according to the update requested by the client.

According to embodiments, there is apparatus for use in identifying nodes in a network, the network comprising a cluster of nodes which are responsible for providing replicas of functions for clients in the network, the apparatus being configured to, at a given node in the cluster: receive, from a client, a request to apply an update to a given function configured as replicas of the given function on a plurality of nodes in the cluster, the update request comprising an identifier for the given function, the given function identifier comprising information encoded using a probabilistic set, the information being associated with each of the nodes in the plurality of nodes on which the given function has been configured; decode the encoded information to identify each of the nodes in the plurality of nodes on which respective replicas of the given function have been configured; and transmit at least one replica function update message to one or more of the identified nodes to instruct update of their respective configured replicas of the given function according to the update requested by the client.

According to embodiments, there is a computer program adapted to perform a method of identifying nodes in a network, the network comprising a cluster of nodes which are responsible for providing replicas of functions for clients in the network, the method comprising, at a given node in the cluster: receiving, from a client, a request to apply an update to a given function configured as replicas of the given function on a plurality of nodes in the cluster, the update request comprising an identifier for the given function, the given function identifier comprising information encoded using a probabilistic set, the information being associated with each of the nodes in the plurality of nodes on which the given function has been configured; decoding the encoded information to identify each of the nodes in the plurality of nodes on which respective replicas of the given function have been configured; and transmitting at least one replica function update message to one or more of the identified nodes to instruct update of their respective configured replicas of the given function according to the update requested by the client.

Further features of embodiments will become apparent from the following description of embodiments, given by way of example only, which is made with reference to the accompanying drawings.

DETAILED DESCRIPTION OF CERTAIN INVENTIVE EMBODIMENTS

Figure 1:
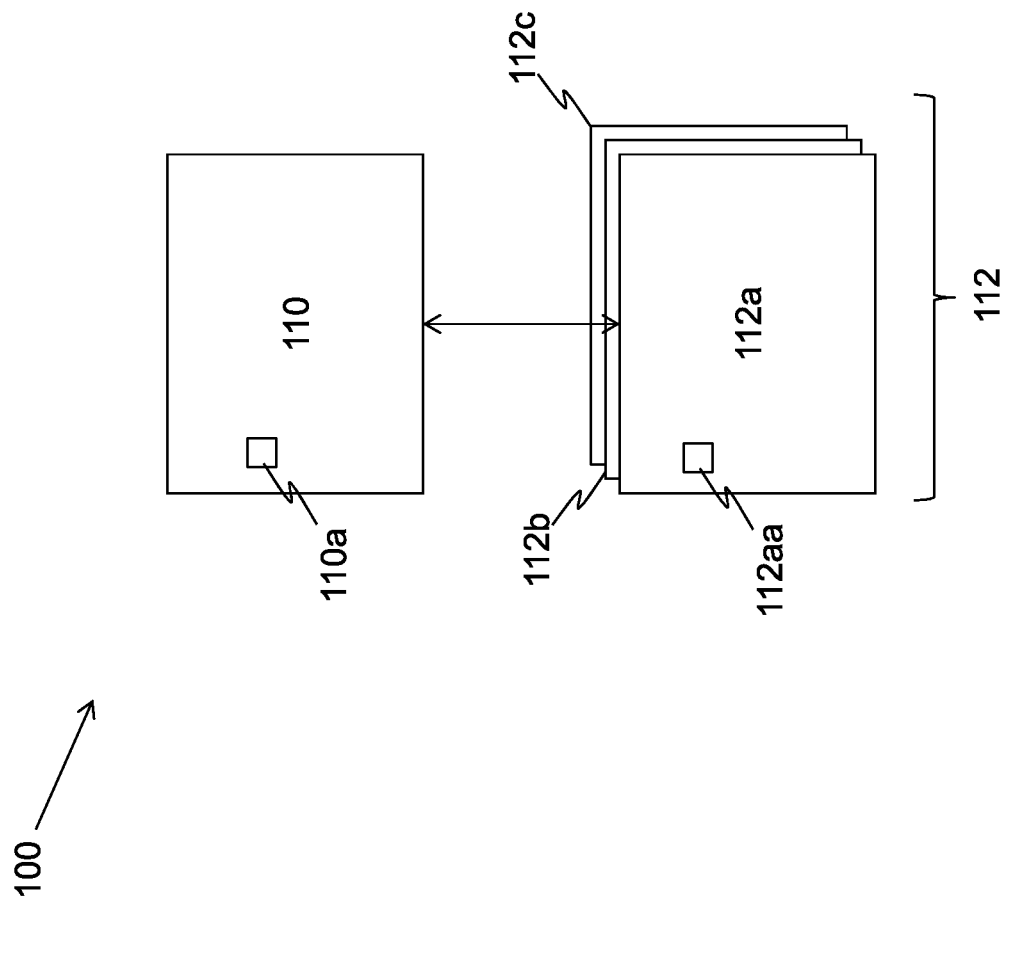
FIG. 1 shows a network according to one or more embodiments of the present invention.

FIG. 1 shows a network 100 according to embodiments. Network 100 comprises a client 110 configured to communicate with a cluster of network nodes 112. Network 100 may for example comprise a packet-switched network such as the Internet. Network nodes in network node cluster 112 are configured to communicate with each other and are responsible for providing services to clients in network 100. In embodiments described herein, network nodes in network node cluster 112 are responsible for providing timer services to clients in the network, but embodiments may also be applied to the provision of services other than timer services.

Network node 112a comprises a processor and/or memory 112aa for carrying out various data processing tasks and/or for providing data storage according to embodiments. Network nodes 112b and 112c comprise similar processors and/or memories (not shown). In the example network 100 depicted in FIG. 1, network node cluster 112 comprises three network nodes, namely network node 112a, network node 112b and network node 112c. In practice, network node cluster 112 may comprise more or fewer than three network nodes.

Client 110 comprises a processor and/or memory 110a for carrying out various data processing tasks and/or for providing data storage according to embodiments. In some embodiments, client 110 comprises a network node, but in other embodiments, client 110 comprises a user device (or 'user equipment' or 'endpoint'). The example network 100 of FIG. 1 only depicts a single client device 110; however, embodiments also apply where more than one client device is employed, for example a cluster of client devices (not shown).

Some embodiments are implemented as a service that runs on a cluster of network nodes (for example servers or other such devices with suitable computing and communication capabilities) that can communicate with each other in a network, for example using an Internet Protocol (IP) such as IP version 4 (IPv4) or IP version 6 (IPv6).

In embodiments, network nodes in cluster 112 comprise a non-redundant timer heap/wheel component that receives timers, stores them in memory in 'soonest-to-pop' order and calls each timer's callback when its timer is scheduled to pop.

In embodiments, network nodes in cluster 112 comprise a replicating proxy component that sits above the timer heap and handles requests from the client to create/update/delete timers, for example by determining an (ordered) list of replicas for a given timer and forwarding the message on to those replicas. In embodiments, when a timer create request is received, the proxying component picks a unique identifier for the timer and passes it to the client to be used to update/delete the timer later.

Figure 2:
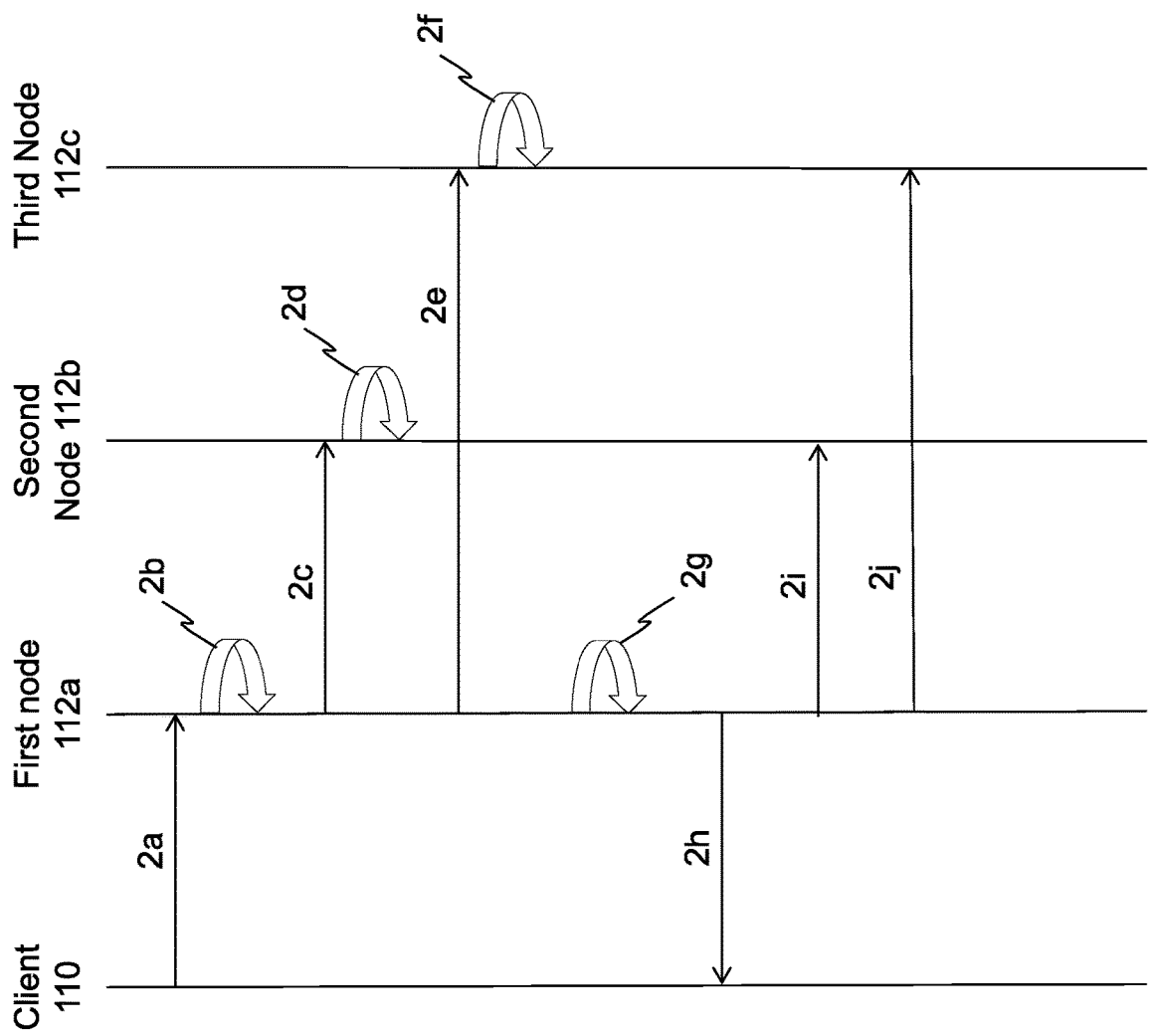
FIG. 2 shows a flow diagram according to one or more embodiments of the present invention.

Embodiments comprise measures (including methods, apparatus and computer programs, and/or computer program products) for use in providing timer services in a network 100. As described above in relation to FIG. 1, network 100 comprises a cluster of network nodes 112 responsible for providing timer services to clients such as client 110 in the network. FIG. 2 shows a flow diagram according to embodiments, for example implemented in the network depicted in FIG. 1.

In step 2a, a request to provide a timer is received from a client 110 at a first network node 112a in the cluster.

In step 2b, first node 112a initiates configuration of a primary replica of the requested timer on a node in the cluster to pop after a first time has elapsed. The popping of the primary timer replica comprises initiating callback of a given client.

Note that in the example embodiments depicted in FIG. 2, node 112a initiates configuration of the primary replica on a node in the cluster by configuring the primary replica on itself, i.e. the node at which the timer provision request is received is the same as the node at which the primary replica is configured.

In alternative embodiments, the timer provision request is received at a different node to the first node at which the primary replica is configured. In such embodiments, the initiation of the configuration of the primary replica on a node in the cluster comprises the node which received the timer provision request transmitting a further timer replication message to the first node at which the primary replica is to be configured, the further timer replication message indicating that the first node should configure a primary backup replica of the requested timer, the further timer replication message being operable to allow the first node to derive that it should configure the primary backup replica of the requested timer to pop after the first time.

In step 2c, first node 112a transmits a first timer replication message to a second network node 112b in the cluster. The first timer replication message indicates that the second node 112b should configure a first backup replica of the requested timer. The first timer replication message is operable to allow second node 112b to derive that it should configure the first backup replica of the requested timer to pop after the first time plus a first skew time have elapsed.

In step 2d, in response to receipt of the first timer replication message of step 2c, second node 112b configures a first backup replica of the requested timer on node 112b to pop after a first time plus a first skew time have elapsed.

In step 2e, first node 112a transmits a second timer replication message to a third network node 112c in the cluster. The second timer replication message indicates that third node 112c should configure a second backup replica of the requested timer. The second timer replication message is operable to allow third node 112c to derive that it should configure the second backup replica of the requested timer to pop after the first time plus a second skew time have elapsed. The second skew time is greater than the first skew time.

In step 2f, in response to receipt of the second timer replication message of step 2e, third node 112c configures a second backup replica of the requested timer on node 112c to pop after a first time plus a second skew time have elapsed. The second skew time is greater than the first time.

After a time equal to the first time has elapsed, the timer configured on first node 112a pops in step 2g and callback of the given client is initiated in step 2h. In the embodiments depicted in FIG. 2, the given client is the same as the client which requested provision of the timer in step 2a, so callback is initiated to the same client which requested provision of the timer.

In alternative embodiments, the given client is a different client to the client which requested provision of the timer in step 2a, so callback is initiated to a different client than the client which requested provision of the timer.

In the embodiments depicted in FIG. 2, the popping of the primary timer replica on first node 112a comprises first node 112a notifying second node 112b and third node 112c that they should not pop their respective configured timer replicas in steps 2i and 2j. Notifying second node 112b and third node 112c in this manner helps prevent multiple callbacks to the given client being initiated in relation to the timer.

Figure 3:
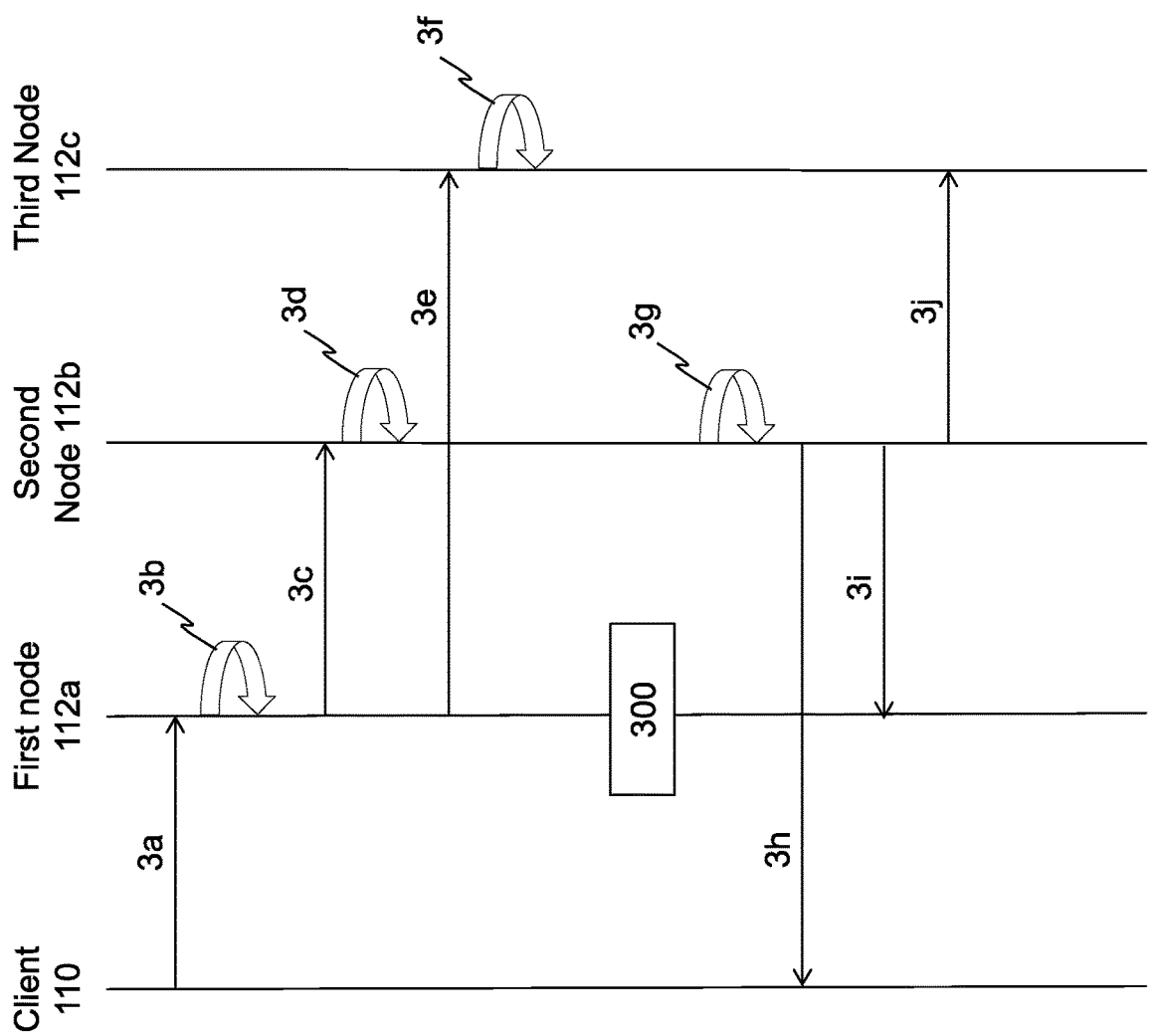
FIG. 3 shows a flow diagram according to one or more embodiments of the present invention.

FIG. 3 shows a flow diagram according to embodiments, for example implemented in the network depicted in FIG. 1. Steps 3a to 3f of FIG. 3 occur in a similar manner to steps 2a to 2f described above in relation to FIG. 2. In the embodiments of FIG. 3, however, first node 112a fails before the first time has elapsed as shown by item 300. This means that the primary replica of the timer configured on first node 112a does not pop after the first time has elapsed. In the embodiments of FIG. 3, after a further first skew time (after the first time) has elapsed, the first backup replica of the timer configured on second node 112b pops in step 3g. The popping of the first backup timer replica on second node 112b comprises second node 112b initiating callback of the given client in step 3h.

In embodiments, popping of the first backup timer replica comprises second node 112b notifying first node 112a that it should not pop its configured primary timer replica in step 3i. In embodiments, popping of the first backup timer replica comprises second node 112b notifying third node 112c that it should not pop its configured second backup timer replica in step 3j. Notifying first node 112a and third node 112c in this manner helps prevent multiple callbacks to the given client being initiated in relation to the timer. Note that since first node 112a failed at some time before the first time elapsed, it would not be able to process the notification or pop its configured primary replica of the timer anyway, but in embodiments, second node 112b still performs the notification of step 3i anyway (for example in case first node 112a recovers during the intervening period).

Figure 4:
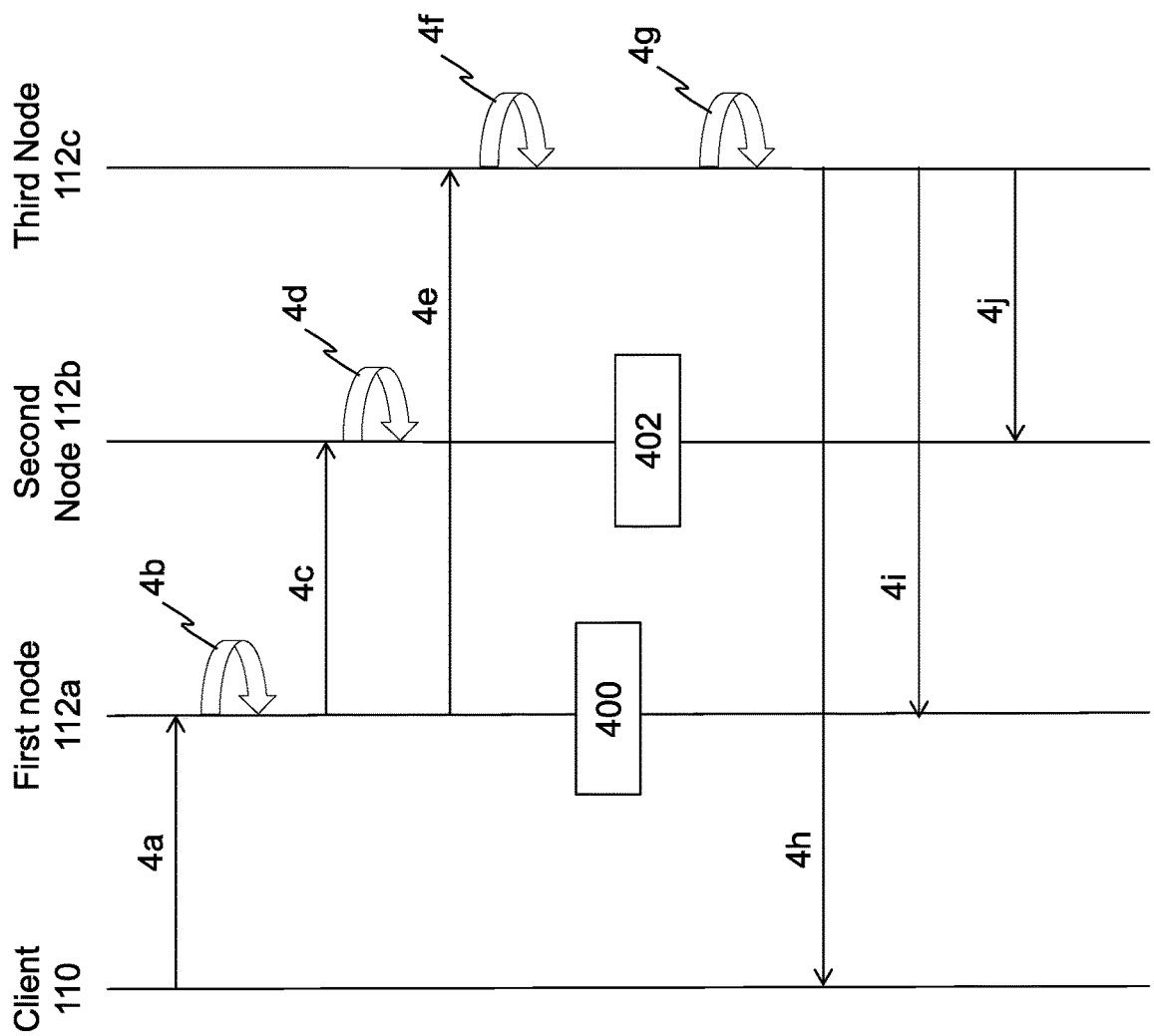
FIG. 4 shows a flow diagram according to one or more embodiments of the present invention.

FIG. 4 shows a flow diagram according to embodiments, for example implemented in the network depicted in FIG. 1. Steps 4a to 4f of FIG. 4 occur in a similar manner to steps 2a to 2f described above in relation to FIG. 2. In the embodiments of FIG. 4, however, first node 112a fails before the first time has elapsed as shown by item 400. This means that the primary replica of the timer configured on first node 112a does not pop after the first time has elapsed. Also, second node 112b fails before the first time plus the first skew time have elapsed as shown by item 402. This means that the first backup of the timer configured on second node 112b does not pop after the first time plus the first skew time have elapsed.

In the embodiments of FIG. 4, after a further second skew time (after the first time) has elapsed, the second backup replica of the timer configured on third node 112c pops in step 4g. The popping of the second backup timer replica on third node 112c comprises third node 112c initiating callback of the given client in step 4h.

In embodiments, popping of the second backup timer replica comprises third node 112c notifying first node 112a that it should not pop its configured primary timer replica in step 4i. In embodiments, popping of the second backup timer replica comprises third node 112c notifying second node 112b that it should not pop its configured first backup timer replica in step 4j. Notifying first node 112a and second node 112b in this manner helps prevent multiple callbacks to the given client being initiated in relation to the timer. Note that because first node 112a failed at some time before the first time elapsed and second node 112b failed at some time before the first time plus the first skew time elapsed, they would not be able to process the notifications or pop their respective configured replicas of the timer anyway, but in embodiments, third node 112c still performs the notifications of step 4i and 4j anyway (for example in case one or more of first node 112a and second node 112b recover during the intervening period).

In embodiments, each replica of the timer configures its instance of the timer to pop (for example from a local data store) after a small delay. The delay is skewed more for each extra replica that is configured; in the example embodiments of FIGS. 2 to 4 described above, the primary replica is configured to pop after zero skew after the first time has elapsed, the first backup replica is configured to pop after the first skew time has elapsed after the first time has elapsed, and the second backup replica is configured to pop after the second skew time (which is greater than the first skew time) has elapsed after the first time has elapsed. Configuration of such incremental (or 'staggered') skew times across replicas enables prevention of redundant timer pops and avoids erroneous additional callbacks to the client. Such incremental skew times can be implemented in further timer replicas in addition to the primary, first backup and second backup replicas described in the example embodiments above.

Embodiments enable prevention of duplicated pops from replicas of a configured timer. In embodiments, timers are configured by a client to pop at a given time, but, to prevent redundant pops, the replication message includes an ordered list of replicas for the timer and each replica configures their instance of the timer to pop from their local store after a small delay (or 'skew'). In embodiments, the delay is skewed more for each extra replica (for example, the primary replica is configured to pops after 0 skew, the first backup replica 2 seconds later, the next backup replica 2 seconds after that and so on).

After a timer pops and the callback is successfully performed, the replica that handled the timer notifies all the other replicas that they should skip that instance of the timer as it has already been handled. In the example in the preceding paragraph, this means that, assuming the callback takes less than 2 seconds, the client will not see duplicate timer pops (unless there is a net-split between one or more of the nodes on which the timer replicas are configured).

The timer skew time which a node in the cluster should apply when configuring a timer need not be explicitly indicated in the first and second timer replication messages transmitted from first node 112a to second node 112b and third node 112c respectively. In embodiments, the second and third nodes can derive appropriate skew times from the first and second timer replication messages even when such skew times are not themselves contained in the first and second timer replication messages.

Embodiments comprise, first node 112a generating an ordered list of identifiers for nodes in the cluster which are to provide replicas of the requested timer. In embodiments, the ordered list comprises an identifier for first node 112a at the top of the list, an identifier for second node 112b in the middle of the list, and an identifier for third node 112c at the bottom of the list. In embodiments, the ordered list is comprised within the first and second timer replication messages.

In embodiments, the first timer replication message is operable to allow second node 112b to derive that it should configure the first backup replica of the requested timer to pop after the first time plus a first skew time have elapsed on the basis of the position of second node 112b in the ordered list.

In embodiments, the first timer replication message is operable to allow second node 112b to derive that it should configure the first backup replica of the requested timer to pop after the first time plus a first skew time have elapsed on the basis of second node 112b being positioned above third node 112c in the ordered list.

In embodiments, the first timer replication message is operable to allow second node 112b to derive that it should configure the first backup replica of the requested timer to pop after the first time plus a first skew time have elapsed on the basis of second node 112b being positioned below first node 112a in the ordered list.

In embodiments, the second timer replication message is operable to allow third node 112c to derive that it should configure the second backup replica of the requested timer to pop after the first time plus a second skew time have elapsed, wherein the second skew time is greater than the first skew time, on the basis of the position of third node 112c in the ordered list.

In embodiments, the second timer replication message is operable to allow third node 112c to derive that it should configure the second backup replica of the requested timer to pop after the first time plus a second skew time have elapsed, wherein the second skew time is greater than the first skew time, on the basis of third node 112c being positioned below second node 112b in the ordered list.

In embodiments, the second timer replication message is operable to allow third node 112c to derive that it should configure the first backup replica of the requested timer to pop after the first time plus a second skew time have elapsed, wherein the second skew time is greater than the first skew time, on the basis of third node 112c being positioned below first node 112a in the ordered list.

Embodiments comprise first node 112a selecting a unique identifier for the requested timer and notifying client 110 (or another client) of the selected unique identifier. In embodiments, one or more of the first and second timer replication messages comprise the selected unique identifier.

In embodiments, a network node (for example first node 112a, but could be second node 112b or third node 112c) in the cluster of nodes, receives an update request for the timer and the update request comprises the notified unique identifier. By examining the unique identifier for the timer contained in the update request, the network node which received the update (in this example first node 112a) is therefore able to identify which timer the update request relates.

In embodiments, first node 112a which received the update request reconfigures the primary timer replica according to the received update request. Note that the primary replica need not necessarily be configured on the node which receives the update request for a timer; in such embodiments, the node receiving the update request transmits a timer update message to the node on which the primary replica is configured.

In embodiments, first node 112a transmits a first timer update message to second node 112b. The first timer update message indicates that second node 112b should reconfigure the first backup timer replica according to the received update request. In embodiments, first node 112a transmits a second timer update message to third node 112c. The second timer update message indicates that third node 112c should reconfigure the second backup timer replica according to the received update request.

In some embodiments, the update request comprises a request to apply one or more changes to the replicas of the timer configured on the first, second and third nodes (112a, 112b, 112c respectively); in some such cases, the one or more changes could be deletes.

In some embodiments, the update request comprises a request to delete the replicas of the timer configured on the first, second and third nodes (112a, 112b, 112c respectively).

In embodiments, first node 112a selects a unique identifier for the requested timer and deterministically selects the second and third nodes (112b and 11c respectively) from the cluster to configure the first and second backup replicas of the timer on respectively on the basis of the selected unique identifier.

In embodiments, first node 112a configures the primary replica of the timer on first node 112a to pop recurrently a given number of times after successive multiples of the first time elapse. In embodiments, the first timer replication message indicates that second node 112b should configure the first backup timer replica to pop recurrently the given number of times after the first skew time plus successive multiples of the first time plus elapse, and the second timer replication message indicates that third node 112c should configure the second backup timer replica to pop recurrently the given number of times after the second skew time plus successive multiples of the first time elapse.

In some embodiments, in response to receipt of the timer provision request, first node 112a determines the given number of recurrences. In other embodiments, the timer provision request indicates the given number of recurrences.

In some embodiments, in response to receipt of the timer provision request, first node 112a determines the number of required replicas of the requested timer and/or the first time of the requested timer. In other embodiments, the number of required replicas of the requested timer and/or the first time of the requested timer are indicated in the timer provision request.

In some embodiments, the network comprises a cluster of clients including the given client and the timer provision request is received from the given client. In other embodiments, the network comprises a cluster of clients including the given client and the timer provision request is received from a different client to the given client in the cluster of clients.

In some embodiments, network nodes in cluster 112 are co-located with clients in a client cluster and a client in the cluster may specify that the timer callback is handled by the client instance local to the network node instance that handles the timer pop. In this way, if a network node instance fails, its co-located client instance will fail the callback and the next replica of the timer will attempt to trigger the callback on its local network node (which hopefully is still operational). In some such embodiments, the network comprises a cluster of clients including the given client, the client cluster is co-located with the cluster of network nodes responsible for providing timer services in the network, and the timer provision request specifies that callback in relation to the requested timer should be initiated at the given client local to first node 112a.

In some embodiments, a client callback is implemented via a Hypertext Transfer Protocol (HTTP) interface. In embodiments, as part of creating the timer, a client specifies a uniform resource locator (URL) to be notified of the timer's pop (possibly along with some opaque data). This URL may then use DNS load-balancing or an HTTP proxy to direct the callback to an arbitrary node in the client cluster which will handle the request.

In some embodiments, the network comprises a cluster of clients including the given client, and the timer provision request comprises a URL at which callback in relation to the requested timer of the given client in the cluster should be initiated. In some such embodiments, the URL is operable to select the given client from the cluster of clients on the basis of load balancing within the cluster, or an arbitrary choice of client within the cluster.

In embodiments, a scenario might exist where a timer has just popped on a network node in cluster 112, and is being slowly replicated to the replicas. While this is going on, a client attempts to update that timer. The relevant replicas receive the client's request and store it in the timer heap component and then they receive the replicated timer and store that, overwriting the client's requested change. Therefore, in embodiments, the proxying component of the network node of cluster 112 which receives the requested change records in association with the timer the time at which the client last created/changed the timer and includes this in the replication messages transmitted to the other nodes on which replicas of the timer are configured. When storing a timer in the timer store, the instance of the timer with the later start-time is kept and the other timer is ignored. This means that regardless of the order that the update/replication request arrives at the timer store, the updated timer will be used from that point on.

In embodiments, first node 112a stores time data indicating the time of receipt of the timer provision request and/or the last time a client requested an update to the configured timer, and includes the stored time data in the first and second timer replication messages.

To prevent a timer from being leaked and running forever (or at least longer than desired/expected), timers can be constructed with a predetermined maximum runtime length (or 'repeat-for parameter') which will be the maximum length of time a timer will run for before deleting itself. This means that, in the worst case, the timer may continue to pop for at most repeat-for seconds after a delete operation on the timer was attempted. In embodiments, the primary replica of the requested timer is configured on first node 112a with a predetermined maximum runtime length, which, if reached, will trigger a delete operation for the primary timer replica configured on first node 112a. In some such embodiments, first node 112a includes configuration of the predetermined maximum runtime length and associated delete operation trigger in the first and second timer replication messages in order to apply corresponding configuration to the first and second backup replicas of the timer configured on second and third nodes 112b, 112c respectively.

In some embodiments, the predetermined maximum runtime length (or 'repeat-for parameter') is comprised in the timer provision request.

In embodiments, a network node such as first node 112a receives a request to delete the replicas of the timer configured on the first, second and third nodes. In such embodiments, first node 112a delays deletion of the primary replica of the timer configured on first node 112a until after a predetermined time has elapsed.

In some such embodiments, first node 112a transmits a first timer delete message to second node 112b. The first timer delete message indicates that second node 112b should delete the first backup replica of the timer configured on second node 112b after the predetermined time has elapsed. In some such embodiments, first node 112a also transmits a second timer delete message to third node 112c. The second timer update message indicates that third node 112c should delete the second backup replica of the timer configured on third node 112c after the predetermined time has elapsed.

The embodiments of the preceding two paragraphs can be referred to as 'tombstone record' embodiments; the first paragraph implements a tombstone record for the timer replica configured on first node 112a and the second paragraph implements tombstone records for the timer replicas configured on second node 112b and third node 112c.

An example scenario of how tombstone record embodiments could be employed is now given. Suppose a situation exists where a timer has just popped on a node and this pop event is being replicated to other nodes. While this is going on, the client deletes that timer. The delete request arrives at a replica and the replica removes the timer from its local store. After this, the replication request arrives and the replica stores the replicated timer in its store, thus re-creating it. When this re-created timer pops, the replica will then replicate it to the other replicas, restoring the redundancy on the timer and increasing the load on the system. To resolve this issue, in embodiments, timers are not immediately deleted from the store, instead, they are converted into 'tombstone records' that survive for example for one more timer interval and which are destroyed automatically after that time. These tombstone records include a record of when they were created, thus preventing any outstanding replication requests from re-creating the timer.

Some further worked example embodiments are now described where a primary replica configured on a first node is referred to as Replica A, a first backup replica configured on a second node is referred to as Replica B, and a second backup replica configured on a third node is referred to as Replica C. The first time here is 30 seconds, the first skew time is 2 seconds and the second skew time is 4 seconds.

At time 0, a client requests a timer to pop in 20 seconds with 3 replicas, and to recur 6 times.

So, Replica A sets a timer to pop at time 20, Replica B sets a timer to pop at time 22, and Replica C sets a timer to pop at time 24.

At time 20, Replica A's timer pops. Replica A triggers the callback to the client successfully and replicates this to B and C.

Now, Replica A resets its timer to pop at 40, Replica B resets its timer to pop at 42, and Replica C resets its timer to pop at 44.

At this point, Replica A fails catastrophically. At time 40 nothing happens, because Replica A is dead.

At time 42, replica B's timer pops, it handles the callback to the client and notifies the other replicas. Replica B cannot reach Replica A, but Replica B can inform Replica C.

At this time, Replica A is dead. Replica B resets its timer to pop at 62 and Replica C resets its timer to pop at 64.

At this point, a net-split occurs between the nodes where Replicas B and C are configured so, although both the nodes where Replica B and Replica C are configured are running, they cannot communicate with each other at all.

At time 62, the timer on Replica B pops, Replica B handles the callback and attempts to notify the other replicas (Replica A and Replica C). Replica B cannot reach either of Replica A or Replica C.

Now, Replica A is dead. Replica B resets its timer to pop at 82 and Replica C's timer is configured to pop at 64.

At time 64, the timer on Replica C pops. C handles the callback to the client (Note, this is a duplicate of the timer that Replica B just popped). Replica C again attempts to update the timers on the other nodes (where Replica A and B have been configured), but fails.

Now, Replica A is dead. Replica B's timer will pop at 82. Replica C resets its timer to pop at 84.

Now, the net-split between the nodes where Replicas B and C are configured heals, so that B and C can see each other again (i.e. they are able to communicate with each other again).

At time 82, the timer on Replica B pops, so Replica B handles the callback to the client and replicates this to Replica C.

At this time, Replica A is dead. Replica B resets its timer to pop at 102. Replica C resets its timer to pop at 104.

Now, node A recovers, but has lost all configuration data for the timer.

At time 102, the timer on Replica B pops, and Replica B handles the callback and replicates this to Replicas A and C.

Now, Replica A sets a new timer to pop at 120, Replica B resets its timer to pop at 122, and Replica C resets its timer to pop at 124.

Finally, at time 120, Replica A pops and handles the callback to the client. Replica A determines that this is the final pop that this timer is allowed to pop (on the basis of a predetermined maximum runtime length of 120 calculated from a timer popping interval of 20 seconds and 6 recurrences of the timer). Replica A instructs Replicas B and C to delete their replicas of the timer.

Now, Replica A has no local timer set, Replica B has no local timer set, and Replica C has no local timer set.

Note that, in the worked example embodiments described above, if tombstone records are implemented, instead of the example timer lifetime being 120 at the last stage, each of the replicas holds a tombstone record (in this example a tombstone record which lasts for a single timer interval=20 seconds) for the timer and, at time 140 these tombstone records are finally deleted (rather than at 120 if the tombstone records were not implemented).

Embodiments described above involve a given node transmitting first and second timer replication messages directly to the second and third nodes respectively.

In further embodiments, these replication messages could daisy-chain from one replica to the next, or could be transmitted through some form of fan-out/gossip topology where some nodes act as proxies to forward messages to others. As one example, the first node could send a replication message to the second node and the second node could then send a replication message on to the third node.

In embodiments, two of more of the first, second and further replication messages comprise the same content. In embodiments, two of more of the first, second and further replication messages comprise the same message. In embodiment, two of more of the first, second and further replication messages are transmitted using a multicast transmittal mechanism.

Further embodiments comprise a method of providing timer services in a network, the network comprising a cluster of network nodes responsible for providing timer services to clients in the network, the method comprising, at a given node in the cluster:

receiving, from a client, a request to provide a timer;

initiating configuration of a primary replica of the requested timer on a first node in the cluster to pop after a first time has elapsed, the popping of the primary timer replica comprising initiating callback of a given client;

transmitting a first timer replication message to a second node in the cluster, the first timer replication message indicating that the second node should configure a first backup replica of the requested timer, the first timer replication message being operable to allow the second node to derive that it should configure the first backup replica of the requested timer to pop after the first time plus a first skew time have elapsed, the popping of the first backup timer replica comprising initiating callback of the given client; and initiating transmittal of a second timer replication message to a third node in the cluster, the second timer replication message indicating that the third node should configure a second backup replica of the requested timer, the second timer replication message being operable to allow the third node to derive that it should configure the second backup replica of the requested timer to pop after the first time plus a second skew time have elapsed, the second skew time being greater than the first skew time, the popping of the second backup timer replica comprising initiating callback of the given client.

In some such further embodiments, the initiating of the transmittal of the second timer replication message comprises the first node instructing the second node to transmit a second timer replication message on to the third node.

In further embodiments, the replication messages are all identical for a single replication operation and are transmitted to each replica simultaneously via an IP multicast operation.

Some implementation options for embodiments described above are given here:

In embodiments, one or more of the following are transmitted over Hypertext Transfer Protocol (HTTP):
the timer provision request, and
the first, second and/or further timer replication messages.

In embodiments, the timer provision request specifies one or more of the first time (i.e. the timer interval), the predetermined maximum runtime length (or "repeat-for" parameter—this defaults to the timer interval if not specified), a number of backup replicas (defaults to 2 if not specified), a callback Uniform Resource Identifier (URI), and a callback Hypertext Transfer Protocol (HTTP) body.

In embodiments, the first skew time is 2 seconds and the second skew time is 4 seconds.

In embodiments, one or more of the first, second and/or further timer replication messages comprise a start time for the timer.

Figure 5:
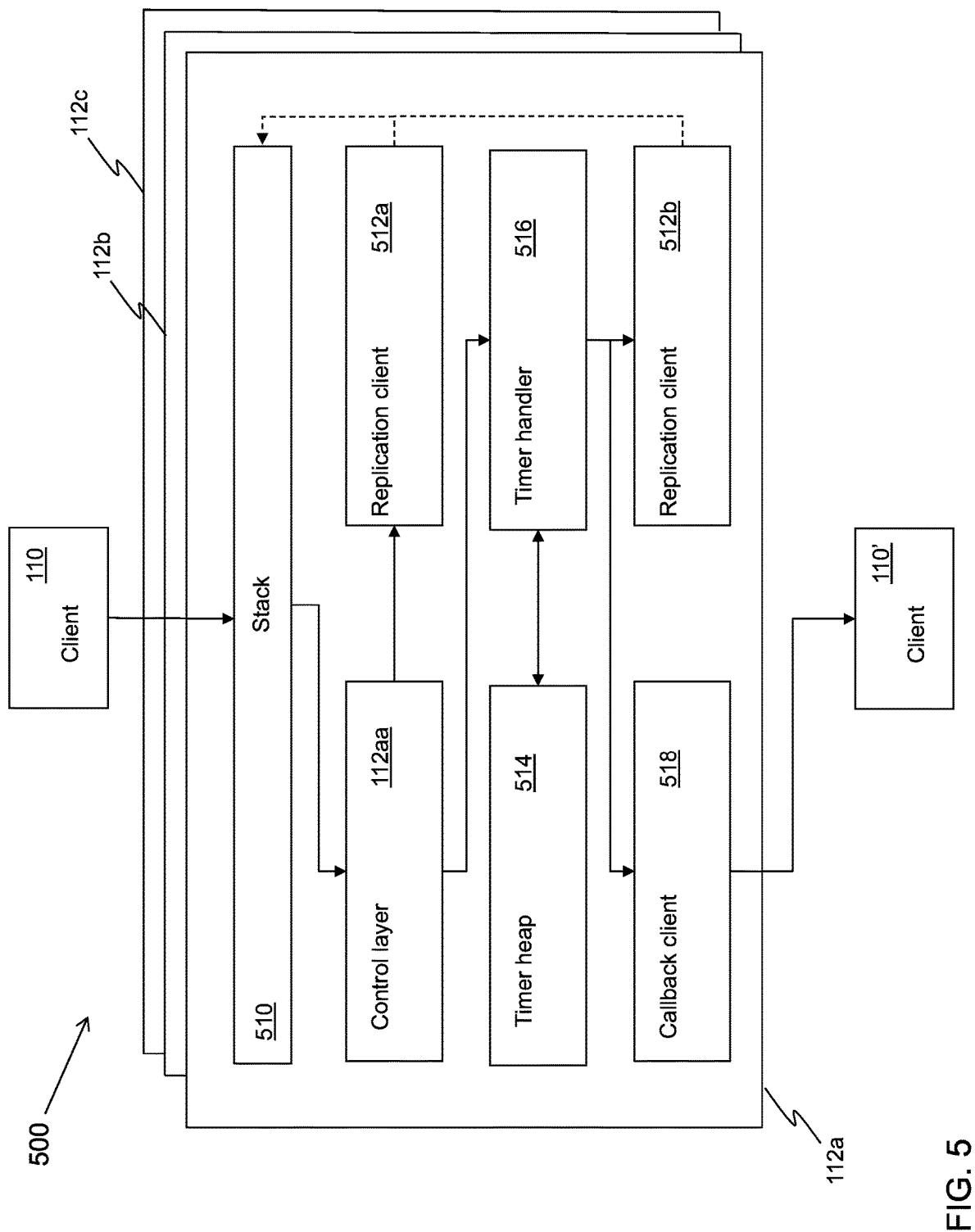
FIG. 5 shows a block diagram according to one or more embodiments of the present invention.

In embodiments, replicated timer messages (sent in series to each of replicas) also include the list of replicas and the start time of the timer. In embodiments employing tombstone records, the timer start-time is used as a tie-breaker for handling conflicts in timer definitions. FIG. 5 shows a block diagram of an example timer service provision architecture according to embodiments. FIG. 5 includes client 110 and client 110' where in some embodiments, client 110 is the same client as client 110', but in other embodiments client 110 is a different client to client 110'. Client 110 and client 110' are configured to communicate with network nodes 112a, 112b and 112c which form a cluster of network nodes (and possibly other network nodes (not shown)) responsible for providing services to clients 110 and 110' (and possibly other clients (not shown)) in a network 500.

In embodiments, network node 112a comprises a processing stack 510 (for example an HTTP stack) for receiving and validating timer service provision requests, replication message/configuration, etc.

In embodiments, network node 112a comprises a control layer 112aa (for example comprising one or more processors and memories) for carrying out data processing and data storage tasks according to embodiments. In embodiments, control layer 112aa comprises a module/component which handles the logic of timer provisioning and determination of replicas, for example managing the creation of timers, the replication of timers, and the determination of timer identifiers.

In embodiments, network node 112a comprises a replication client 512a for replicating timer configurations to other nodes in the cluster.

In embodiments, network node 112a comprises a timer heap 514 for receiving timers and storing associated data such as an ordered list of replicas for the timer. Note that in embodiments, the timer heap component only stores data for timers that are owned (either as primary or backup replica) by the local node (i.e. at any given node, data is only stored at that node for timers configured locally on that node).

In embodiments, network node 112a comprises a timer handler 516 for running timers, keeping track of elapsed times in relation to timers and informing callback client 518 and replication client 512b when a timer pops.

In embodiments, network node 112a comprises a callback client 518 responsible for initiating callback requests to clients such as client 110' when a timer pops.

In embodiments, network node 112a comprises replication client 512b for replicating timer pops to other nodes in the cluster.

In embodiments, network nodes 112b and 112c comprise similar features to the various embodiments of network node 112a.

Embodiments described below relate to dynamic scaling of the number of nodes in cluster 112. Dynamic scaling may for example involve adding one or more nodes into cluster 112 in order to accommodate for an increased demand Conversely, dynamic scaling may for example involve deleting one or more nodes from cluster 112 when demand decreases.

In embodiments where dynamic scaling is not implemented, firstly, a proxy component can pick replicas for a timer in a deterministic way such that any other proxy component could make the same decision given a timer identifier in order to update or delete a timer. Secondly, replicas have a record of which the other replicas are for the timer(s) they are handling (they have this information so they can calculate their skew, as described in embodiments above).

However, in embodiments where dynamic scaling is implemented, the second sentence in the preceding paragraph holds true, but the first sentence becomes a different proposition because the deterministic process needs to know what the cluster looked like when the timer was first created so that it can repeat the algorithm to determine the correct replica list.

Embodiments therefore employ storing the list of replicas and appending the replica list or an encoding thereof to a unique identifier for a timer when generating its handle to return to the client. When a request from a client arrives, the proxy component checks the appended data against the current list of members in the cluster and replicates the timer to all that match. Such embodiments need not be limited to application to timers and can be applied to functions (for example timer functions) in general.

Figure 6:
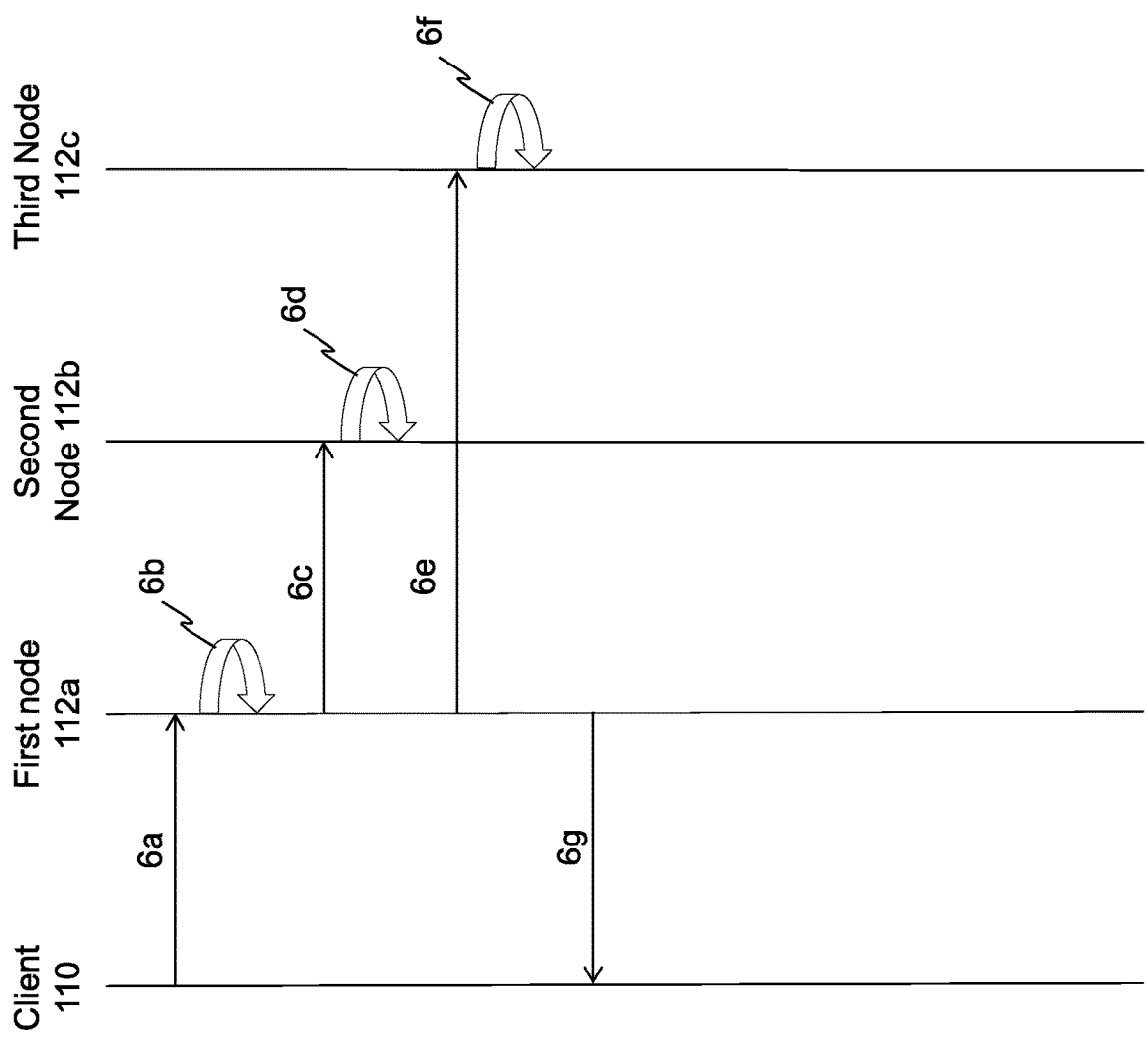
FIG. 6 shows a flow diagram according to one or more embodiments of the present invention.

Embodiments comprise measures (including methods, apparatus and computer programs, and/or computer program products) for use in identifying nodes in a network 100. The network comprises a cluster of nodes 112 which are responsible for providing replicas of functions for clients in the network. FIG. 6 shows a flow diagram according to embodiments, for example implemented in a network depicted in FIG. 1.

At a node 112a in the cluster, a request is received from a client 110 in step 6a, to apply an update to a given function configured as replicas of the given function on a plurality of nodes in the cluster. In this example, the given function has been configured previously on each of nodes 112a, 112b and 112c, so the plurality of nodes comprises these three nodes.

The update request comprises an identifier for the given function. The given function identifier comprises information encoded using a probabilistic set, the information being associated with each of the nodes in the plurality of nodes on which the given function has been configured.

In step 6b, node 112a decodes the encoded information to identify each of the nodes in the plurality of nodes on which respective replicas of the given function have been configured. Note that the arrow of step 6b indicates node 112a performing the decoding of the encoded information to identify nodes in the plurality; if node 112a is identified in the decoded information as being a node on which a replica of the function has been configured, then a local data store operation will also be carried out at node 112a in order to update the function configuration.

In steps 6c and 6e, node 112a transmits replica function update messages to one or more of the identified nodes to instruct update of their respective configured replicas of the given function according to the update requested by the client. In this example, a replica function update message is sent to node 112b in step 6c and node 112b updates its configured replica of the given function in step 6d. Another replica function update message is sent to node 112c in step 6d and node 112c updates its configured replica of the given function in step 6f. Therefore, in these embodiments, node 112a transmits a replica function update message to every node identified as being in the plurality (of nodes on which replicas of the given function have been configured) apart from itself.

In embodiments, node 112a informs client 110 in step 6g that the requested update to the given function has been carried out.

Note that in some embodiments, a node in the cluster may request a request from a client to apply an update to a given function and that node receiving the function update request may not be amongst the plurality of nodes on which replicas of the given function have been configured previously. In such embodiments, the node identification process will not identify the node that received the function update request and so that node will transmit a replica function update message to every node identified as being in the plurality.

In embodiments, the probabilistic set comprises a 'positive probabilistic set' which can produce false positives, but cannot produce false negatives. Dynamic scaling of the replica set is thus facilitated. This means that in the worst case scenario, an additional unwanted replica will be added. However, because no false negatives are produced, no replicas will be removed unintentionally.

In alternative embodiments, it may be desirable to use a different type of probabilistic set, for example if say it was required that the number of replicas should not exceed a certain number or suchlike.

In embodiments, a probabilistic set is employed to answer an "Approximate Membership Query" (AMQ), and a data structure is chosen (and size/other properties thereof) to provide the desired characteristics in terms of occupancy, false positive/negative rate, etc. In embodiments, bloom filters are employed, for example because they only produce false positives and also accommodate precalculation of hashes and quick lookups. However, in alternative embodiments, other data structures may be employed, for example a "quotient filter" could be employed as it has similar false positive only properties to a bloom filter. In further alternative embodiments, a retouched bloom filter could be employed; a retouched bloom filter introduces the chance for a false negative, in order to reduce the probability of a false positive.

In embodiments, the probabilistic set comprises a bloom filter (this bloom filter is a timer-specific bloom filter). In some such embodiments, the bloom filter comprises a bloom filter which produces a positive response (or 'accepts') when queried for the presence of a predetermined identifier for any of the nodes in the plurality of nodes.

In embodiments, when a new function (for example a timer) is being created (in the form of a function replica creation process) by a node in the cluster, the node picks replicas for that function (which could be by any means it likes) then looks up a replica-specific filter for each of the chosen replicas and binary ORs them together. This creates a timer-specific bloom filter according to embodiments that accepts each of the chosen replicas (plus possibly some false positives). In embodiments, this constructed timer-specific bloom filter is passed back to the client as the identifier (or part thereof) for the function.

In embodiments, generating the timer-specific bloom filter comprises, for each of the nodes in the plurality of nodes, generating a replica-specific bloom filter on the basis of an identifier for the respective node, and performing a binary OR operation between the replica-specific bloom filters generated for each of the nodes in the plurality of nodes. Embodiments comprise generation of a replica-specific bloom filter for each replica (each of these filters contains the identity of the replica it was calculated from). For example, an identity of 10.1.1.1 say might become the filter 0001001001011 say (in practice, the filters may be longer than this example in order to lower the false positive rate).

In embodiments, the replica-specific bloom filters are generated by nodes in the cluster prior to receipt of the update request in relation to a function replica creation process. The replica-specific bloom filters may for example be calculated when a node in the cluster is started-up or when a node in the cluster is told about a new cluster member.

In embodiments, when a client wishes to update or delete a function, it passes back the identifier for the function to a node in the cluster. The receiving node (which could be a different one to the one that handled the create process for the function replicas) extracts the (timer-specific) bloom filter from this and compares it to its local store of (replica-specific) bloom filters for nodes in the cluster. As an example, if the bloom filter from the identifier in the update/delete request was 100101100111011 say, then an identifier of 10.1.1.1 say might match and be considered a replica for the function. This extraction/comparison process results in a list of replicas for the function that contains all the replicas that the first node in the cluster (i.e. the node which handled the function replica creation process) chose that the second node in the cluster (i.e. the node handling the function update/delete process) is aware of, and may also contain a false positive replica. This list of replicas is then used to distribute function replica update/delete messages to the appropriate nodes (possibly increasing the replication factor of the function in the process).

In embodiments, generating a (replica-specific) bloom filter for a node in the plurality comprises performing a hashing operation on a predetermined identifier for the respective node. In embodiments, the generation is performed by each node independently but deterministically (for example using the same hashing algorithm each time).

Embodiments comprise given node 112a maintaining a store of identifiers for each of the nodes that given node 112a believes are currently in the cluster; in such embodiments, the identification comprises comparing the decoded information with identifiers in the store.

In embodiments where the encoded information comprises a bloom filter, the identification may comprise calculating which bits in the bloom filter would have to be set if each of the nodes identified in the store is in the plurality, and checking for the presence of the calculated set bits in the bloom filter.

In embodiments, the encoded information was generated according to a deterministic process by a node in the cluster prior to receipt of the update request in relation to a previously requested function replica creation process. In some embodiments, the function replica creation process was carried out by the given node, whereas in other embodiments, the function replica creation process was carried out by a different node to the given node in the cluster. In embodiments, the function replica creation process was previously requested by a different client to the client requesting the update request.

Some embodiments relate to dynamic scaling of the cluster of nodes without loss of service. The dynamic scaling may comprise scaling up to include one or more additional nodes in the cluster, or scaling down to remove one or more nodes from the cluster.

In some such dynamic scaling embodiments, when a node in the cluster receives a request (which may comprise a request to make changes to a configured given function or may comprise a request to delete a configured given function) to update an existing configured function, the node extracts the function identifier and a first bloom filter (e.g. BF1) from the given function identifier in the update request, determines the list of replicas from the function identifier and the current view of the cluster, determines a second bloom filter (e.g. BF2) for this list of replicas and compares the two bloom filters. In embodiments, if the comparison reveals that the two bloom filters are not equal, the nodes referenced by the first bloom filter (BF1) are added to the list of replicas on which the configured given function is to be updated. In embodiments, the node then replicates the update to the complete list of replicas. In embodiments, the node responds to the client which requested the update with the combined given function identifier and the second bloom filter (BF2) (which the client can then use for future updates).

The complete list of replicas here refers to the replicas determined by performing the deterministic process on the given function plus possibly the list determined from the supplied bloom filter from the client (assuming the first bloom filer is not equal to the second bloom filter). Thus, all nodes on which changes (whether they be adding, updating or deleting a timer) are required are notified using the supplied bloom filter as a (potential over-) estimate of the nodes currently being used as replicas.

When a node in the cluster receives a replicated given function request it checks whether it is in the list of replicas for the given function. If the node is in the list of replicas for the given function, the node creates/updates/deletes the given function accordingly from its local store. If the node is not in the list of replicas for the given function, the node changes the request to a delete request before applying it to its local store.

In dynamic scaling embodiments, a configured given function is rebalanced each time it is updated, which happens at least once per maximum given function lifetime (as per the predetermined maximum runtime length or 'repeat-for parameter' described above). For scale up of the cluster, this means that load will be taken off the existing nodes over this period. For scale down of the cluster, after this period, it is safe to destroy the removed nodes with no loss of redundancy.

Some embodiments comprise a configurable upper-limit on a given function lifetime such that a request to set a given function that would live too long is rejected. In embodiments where the configurable upper-limit on a given function lifetime is set to a given time, then it will take at most that given time to rebalance a cluster of given functions for a resize.

In embodiments, the nodes on which respective replicas of the given function were configured were first determined by a first node in the cluster prior to receipt of the update request in relation to a previously requested function replica creation process according to a deterministic process on the basis of the given function identifier and the nodes which the first node believed were in the cluster at the time of the function replica creation process; in such embodiments, the probabilistic set used by the first node to encode the first determined nodes comprises a first bloom filter.

In embodiments, the given node second determines the nodes on which respective replicas of the given function are to be updated according to the deterministic process on the basis of the given function identifier and the nodes which the given node believes are in the cluster at the time of receipt of the update request, generates a second bloom filter to encode the second determined nodes, compares the first bloom filter to the second bloom filter, and in response to the comparison indicating at least one discrepancy between the first determined nodes and the second determined nodes, transmits at least one further replica function update message to at least one further node to instruct update of its configured replica of the given function according to the update requested by the client. In embodiments, the first determined nodes comprises the at least one further node. In embodiments, the given node notifies the client of the second bloom filter.

In embodiments, the given function comprises a timer function. In some such embodiments, the popping of the timer function comprises initiating callback of a client by the respective configured replica.

In alternative embodiments, the given function comprises a distributed, redundant file store; in some such embodiments the directory index holds the bloom filters that tell it where to look for the file contents.

In further alternative embodiments, the given function comprises a distributed/redundant worker pool; in some such embodiments the job ID indicates where to ask for progress reports/results of the work. A specific example of this could involve a map-reduce farm which allocated some subset of its workers to a specific job.

In embodiments, the update request comprises a request to apply one or more changes to an existing given function configured on the plurality of nodes. In embodiments where the given function comprises a timer function, the one or more changes may relate to one or more of the following in relation to the timer function: a different configured pop time, a different number of configured replicas, and a different number of configured recurrences. An update request may for example comprise a request to delete an existing given function configured on the plurality of nodes.

In some embodiments, the identification further comprises identifying at least one node in the cluster of nodes on which a replica of the given function has not been configured, and the transmittal further comprises transmitting a replica update message to the at least one node in the cluster which is not in the plurality. In embodiments which make use of bloom filters, false positives may possibly be generated which may in turn cause a timer to gain replicas it previously did not have.

Some embodiments make use of a bloom filter-like mechanism to store replica data. Normally, such a bloom filter-like mechanism would be inefficient because checking a bloom filter to see if a given value is in it involves hashing the value multiple times, which suggests that checking every member from the cluster would be computationally expensive. However, embodiments comprise calculating the bits in the bloom filter that would have to be set if each member of the cluster was a replica ahead of time (since the cluster membership list changes relatively rarely) and check for presence of these in the bloom filter. Such presence checking could for example be carried out using the following example C/C++ code:

if ((bloom_filter & member_bits)==member_bits) {
// Member is (probably) a replica for this timer
}

Performing the above presence check is very cheap (from a computational complexity perspective) in comparison to calculating hashes as is required for standard bloom filter processing.

In embodiments, the order of the replicas cannot be determined from the filter. However, replicas can start using a new order of replicas if instructed to do so (as in embodiments the client request sets the start-time to a more recent date) in an update to a function.

Embodiments employ a fixed size to represent any collection of nodes (such as IPv4/IPv6 nodes). Embodiments provide an ability to add nodes to the cluster without impacting previous timers. Embodiments provide an ability to remove nodes from the cluster (for example in embodiments where bloom filters are employed, such removed nodes will cease to match the bloom filter and will thus not be included in replication of the timer).

In general, embodiments allow (for example either a new node in the cluster learning about other nodes already in the cluster, or a node already in the cluster learning about a new node in the cluster) a collection of independent nodes which each know of a (possibly non-equal because a node may not yet know that another node has been added to the cluster) set of items (the cluster members) to transmit a subset of those items to another node (the replicas) in a fixed size message (for example in a bloom filter) such that the receiving node can create a subset of their set with the following properties:

If a member A is in both nodes' complete sets and is in the first node's subset, it is in the second node's subset.

If a member A is not in the first node's subset but is in the second node's complete set, it probably (with reasonable certainty) is not in the second node's subset.

If a member A is in the first node's subset but is not in the second node's complete set, it will not be in the second node's subset.

Embodiments ensure that the second node's subset contains as much of the first node's subset as possible, whilst minimizing the risk of including extra nodes.

In embodiments which employ bloom filters, the required permanent store of data is one bloom filter per replica. The data in this permanent data store does not need distributing between the nodes in the cluster. The stored filters can be fairly small because they will only store a few values.

Some implementation options for dynamic scaling embodiments are given here:

In embodiments, the generated (timer) function is a unique 64-bit number and a 64-bit bloom filter (reported to the client in hexadecimal representation).

In embodiments, for hashing purposes, three instances of Murmur3 are employed (which produces three 128-bit numbers) which are then divided into two 64-bit numbers (a top half and a bottom half) which in turn give six 64-bit numbers which are used to determine the bits to set in the replica-specific bloom filter (and thus in any timer's filter where this node is chosen as a replica).

Each node calculates the replica-specific filters each time a node is added to the cluster and store them in memory.

In embodiments which require hashing, this hashing can for example be carried out at the start of a day (or upon cluster growth where a new node is added to the cluster). The number of hashes is a multiple of the number of replicas.

In embodiments where the replica list is encoded in an identifier for the function, there is no need to update any state when the function is deleted (although a client can forget the function identifier if it wants).

In embodiments, each network node in cluster 112 comprises a processor or processing system, as depicted for example by processor 112aa for node 112a in FIG. 1. In embodiments, a processing system comprises one or more processors and/or memory. Each network node, client or other entity or device as described in relation to any of the embodiments described above may similarly comprise a processor and/or processing system. One or more of the aspects of the embodiments described herein with reference to the drawings comprise processes performed by network nodes in cluster 112 or any other suitable device. In embodiments, network nodes in cluster 112 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a Random-Access Memory (RAM), a Read-Only Memory (ROM), or an optical memory device, etc.

The following numbered clauses set out various embodiments of the present disclosure:

1. A method of providing timer services in a network, the network comprising a cluster of network nodes responsible for providing timer services to clients in the network, the method comprising, at a given node in the cluster:

receiving, from a client, a request to provide a timer;

initiating configuration of a primary replica of the requested timer on a first node in the cluster to pop after a first time has elapsed, the popping of the primary timer replica comprising initiating callback of a given client;

transmitting a first timer replication message to a second node in the cluster, the first timer replication message indicating that the second node should configure a first backup replica of the requested timer, the first timer replication message being operable to allow the second node to derive that it should configure the first backup replica of the requested timer to pop after the first time plus a first skew time have elapsed, the popping of the first backup timer replica comprising initiating callback of the given client; and transmitting a second timer replication message to a third node in the cluster, the second timer replication message indicating that the third node should configure a second backup replica of the requested timer, the second timer replication message being operable to allow the third node to derive that it should configure the second backup replica of the requested timer to pop after the first time plus a second skew time have elapsed, the second skew time being greater than the first skew time, the popping of the second backup timer replica comprising initiating callback of the given client.

2. A method according to clause 1, wherein the given node comprises the first node and the initiation of configuration of the primary replica comprises configuring a primary replica of the requested timer on the first node to pop after a first time has elapsed.

3. A method according to clause 1, wherein the given node comprises a different node to the first node and the initiation of configuration of the primary replica comprises transmitting a further timer replication message to the first node, the further timer replication message indicating that the first node should configure a primary replica of the requested timer, the further timer replication message being operable to allow the first node to derive that it should configure the primary replica of the requested timer to pop after the first time.

4. A method according to any preceding clause, comprising generating an ordered list of identifiers for nodes in the cluster which are to provide replicas of the requested timer, the ordered list comprising an identifier for the first node at the top of the list, an identifier for the second node in the middle of the list, and an identifier for the third node at the bottom of the list, wherein the first and second timer replication messages comprise the ordered list.

5. A method according to clauses 3 and 4, wherein the further timer replication message comprises the ordered list.

6. A method according to clause 4 or 5, wherein the first timer replication message is operable to allow the second node to derive that it should configure the first backup replica of the requested timer to pop after the first time plus a first skew time have elapsed on the basis of the position of the second node in the ordered list.

7. A method according to any of clauses 4 to 6, wherein the first timer replication message is operable to allow the second node to derive that it should configure the first backup replica of the requested timer to pop after the first time plus a first skew time have elapsed on the basis of the second node being positioned above the third node in the ordered list.

8. A method according to any of clauses 4 to 7, wherein the first timer replication message is operable to allow the second node to derive that it should configure the first backup replica of the requested timer to pop after the first time plus a first skew time have elapsed on the basis of the second node being positioned below the first node in the ordered list.

9. A method according to any of clauses 4 to 8, wherein the second timer replication message is operable to allow the third node to derive that it should configure the second backup replica of the requested timer to pop after the first time plus a second skew time have elapsed, wherein the second skew time is greater than the first skew time, on the basis of the position of the third node in the ordered list.

10. A method according to any of clauses 4 to 9, wherein the second timer replication message is operable to allow the third node to derive that it should configure the second backup replica of the requested timer to pop after the first time plus a second skew time have elapsed, wherein the second skew time is greater than the first skew time, on the basis of the third node being positioned below the second node in the ordered list.

11. A method according to any of clauses 4 to 10, wherein the second timer replication message is operable to allow the third node to derive that it should configure the first backup replica of the requested timer to pop after the first time plus a second skew time have elapsed, wherein the second skew time is greater than the first skew time, on the basis of the third node being positioned below the first node in the ordered list.

12. A method according to any preceding clause, wherein the popping of the primary timer replica comprises the first node notifying the second and third nodes that they should not pop their respective configured timer replicas.

13. A method according to any preceding clause, wherein the popping of the first backup timer replica comprises notifying the first and third nodes that they should not pop their respective configured timer replicas.

14. A method according to any preceding clause, wherein the popping of the second backup timer replica comprises notifying the first and second nodes that they should not pop their respective configured timer replicas.

15. A method according to any preceding clause, comprising selecting a unique identifier for the requested timer and notifying the client of the selected unique identifier.

16. A method according to clause 15, wherein one or more of the first, second and/or further timer replication messages comprise the selected unique identifier.

17. A method according to clause 15 or 16, comprising receiving an update request for the timer, the update request comprising the notified unique identifier.

18. A method according to clause 17, comprising reconfiguring the primary timer replica according to the received update request.

19. A method according to clause 17 or 18, comprising:

transmitting a first timer update message to the second node, the first timer update message indicating that the second node should reconfigure the first backup timer replica according to the received update request; and transmitting a second timer update message to the third node, the second timer update message indicating that the third node should reconfigure the second backup timer replica according to the received update request.

20. A method according to any of clauses 17 to 19, wherein the update request comprises a request to apply one or more changes to the replicas of the timer configured on the first, second and third nodes.

21. A method according to any of clauses 17 to 19, wherein the update request comprises a request to delete the replicas of the timer configured on the first, second and third nodes.

22. A method according to any preceding clause, comprising selecting a unique identifier for the requested timer and deterministically selecting the first, second and third nodes from the cluster to configure the primary replica and first and second backup replicas of the timer on respectively on the basis of the selected unique identifier.

23. A method according to any preceding clause, comprising configuring the primary replica of the timer to pop recurrently a given number of times after successive multiples of the first time elapse.

24. A method according to clause 23, wherein the first timer replication message indicates that the second node should configure the first backup timer replica to pop recurrently the given number of times after the first skew time plus successive multiples of the first time plus elapse and the second timer replication message indicates that the third node should configure the second backup timer replica to pop recurrently the given number of times after the second skew time plus successive multiples of the first time elapse.

25. A method according to clause 23 or 24, comprising in response to receipt of the timer provision request, determining the given number of recurrences.

26. A method according to clause 23 or 24, wherein the timer provision request indicates the given number of recurrences.

27. A method according to any preceding clause, comprising, in response to receipt of the timer provision request, determining the number of required replicas of the requested timer and/or the first time of the requested timer.

28. A method according to any of clauses 1 to 26, wherein the number of required replicas of the requested timer and/or the first time of the requested timer are indicated in the timer provision request.

29. A method according to any preceding clause, wherein the network comprises a cluster of clients including the given client and the timer provision request is received from the given client.

30. A method according to any of clauses 1 to 28, wherein the network comprises a cluster of clients including the given client and the timer provision request is received from a different client to the given client in the cluster of clients.

31. A method according to any preceding clause, wherein the network comprises a cluster of clients including the given client,
wherein the client cluster is co-located with the cluster of network nodes responsible for providing timer services in the network, and
wherein the timer provision request specifies that callback in relation to the requested timer should be initiated at the given client local to the first node.

32. A method according to any of clauses 1 to 30, wherein the network comprises a cluster of clients including the given client, and
wherein the timer provision request comprises a uniform resource locator (URL) at which callback in relation to the requested timer of the given client in the cluster should be initiated.

33. A method according to clause 32, wherein the URL is operable to select the given client from the cluster of clients on the basis of:
load balancing within the cluster, or
an arbitrary choice of client within the cluster.

34. A method according to any preceding clause, comprising:
storing at the first node, time data indicating the time of receipt of the timer provision request and/or the last time a client requested an update to the configured timer; and
including the stored time data in the first and second timer replication messages.

35. A method according to any preceding clause, comprising:
configuring the primary replica of the requested timer on the first node with a predetermined maximum runtime length, which, if reached, will trigger a delete operation for the primary timer replica configured on the first node; and
including configuration of the predetermined maximum runtime length and associated delete operation trigger in the first and second timer replication messages in order to apply corresponding configuration to the first and second backup replicas of the timer configured on the second and third nodes respectively.

36. A method according to any preceding clause comprising:
receiving a request to delete the replicas of the timer configured on the first, second and third nodes; and
delaying deletion of the primary replica of the timer configured on the first node until after a predetermined time has elapsed.

37. A method according to clause 36, comprising:
transmitting a first timer delete message to the second node, the first timer delete message indicating that the second node should delete the first backup replica of the timer configured on the second node after the predetermined time has elapsed; and
transmitting a second timer delete message to the third node, the second timer update message indicating that the third node should delete the second backup replica of the timer configured on the third node after the predetermined time has elapsed.

38. A method according to any preceding clause, wherein one or more of the following are transmitted over Hypertext Transfer Protocol (HTTP):
the timer provision request, and
the first, second and/or further timer replication messages.

39. A method according to any preceding clause, wherein the timer provision request specifies one or more of:
the first time,
the predetermined maximum runtime length,
a number of backup replicas,
a callback Uniform Resource Identifier (URI), and
a callback Hypertext Transfer Protocol (HTTP) body.

40. A method according to any preceding clause, wherein the first skew time is 2 seconds and the second skew time is 4 seconds.

41. A method according to any preceding clause, wherein one or more of the first, second and/or further timer replication messages comprise a start time for the timer.

42. A method according to any preceding clause, wherein two of more of the first, second and further replication messages comprise the same content.

43. A method according to any preceding clause, wherein two of more of the first, second and further replication messages comprise the same message.

44. A method according to any preceding clause, wherein two of more of the first, second and further replication messages are transmitted using a multicast transmittal mechanism.

45. Apparatus for use in providing timer services in a network, the network comprising a cluster of network nodes responsible for providing timer services to clients in the network, the apparatus being configured to, at a given node in the cluster:

receive, from a client, a request to provide a timer;

initiate configuration of a primary replica of the requested timer on a first node in the cluster to pop after a first time has elapsed, the popping of the primary timer replica comprising initiating callback of a given client;

transmit a first timer replication message to a second node in the cluster, the first timer replication message indicating that the second node should configure a first backup replica of the requested timer, the first timer replication message being operable to allow the second node to derive that it should configure the first backup replica of the requested timer to pop after the first time plus a first skew time have elapsed, the popping of the first backup timer replica comprising initiating callback of the given client; and transmit a second timer replication message to a third node in the cluster, the second timer replication message indicating that the third node should configure a second backup replica of the requested timer, the second timer replication message being operable to allow the third node to derive that it should configure the second backup replica of the requested timer to pop after the first time plus a second skew time have elapsed, the second skew time being greater than the first skew time, the popping of the second backup timer replica comprising initiating callback of the given client.

46. A computer program adapted to perform a method of providing timer services in a network, the network comprising a cluster of network nodes responsible for providing timer services to clients in the network, the method comprising, at a given node in the cluster:

receiving, from a client, a request to provide a timer;

initiating configuration of a primary replica of the requested timer on a first node in the cluster to pop after a first time has elapsed, the popping of the primary timer replica comprising initiating callback of a given client;

transmitting a first timer replication message to a second node in the cluster, the first timer replication message indicating that the second node should configure a first backup replica of the requested timer, the first timer replication message being operable to allow the second node to derive that it should configure the first backup replica of the requested timer to pop after the first time plus a first skew time have elapsed, the popping of the first backup timer replica comprising initiating callback of the given client; and transmitting a second timer replication message to a third node in the cluster, the second timer replication message indicating that the third node should configure a second backup replica of the requested timer, the second timer replication message being operable to allow the third node to derive that it should configure the second backup replica of the requested timer to pop after the first time plus a second skew time have elapsed, the second skew time being greater than the first skew time, the popping of the second backup timer replica comprising initiating callback of the given client.

47. A method of identifying nodes in a network, the network comprising a cluster of nodes which are responsible for providing replicas of functions for clients in the network, the method comprising, at a given node in the cluster:

receiving, from a client, a request to apply an update to a given function configured as replicas of the given function on a plurality of nodes in the cluster, the update request comprising an identifier for the given function, the given function identifier comprising information encoded using a probabilistic set, the information being associated with each of the nodes in the plurality of nodes on which the given function has been configured;

decoding the encoded information to identify each of the nodes in the plurality of nodes on which respective replicas of the given function have been configured; and transmitting at least one replica function update message to one or more of the identified nodes to instruct update of their respective configured replicas of the given function according to the update requested by the client.

48. A method according to clause 47, wherein the probabilistic set comprises a bloom filter.

49. A method according to clause 48, wherein the bloom filter comprises a bloom filter which produces a positive response when queried for the presence of a predetermined identifier for any of the nodes in the plurality of nodes.

50. A method according to clause 48 or 49, comprising generating the bloom filter by:

for each of the nodes in the plurality of nodes, generating a replica-specific bloom filter on the basis of an identifier for the respective node; and performing a binary OR operation between the replica-specific bloom filters generated for each of the nodes in the plurality of nodes.

51. A method according to clause 50, wherein generating a replica-specific bloom filter for a node in the plurality comprises performing a hashing operation on a predetermined identifier for the respective node.

52. A method according to any of clauses 47 to 51, comprising maintaining a store of identifiers for each of the nodes that the given node believes are currently in the cluster, wherein the identification comprises comparing the decoded information with identifiers in the store.

53. A method according to clauses 48 and 52, wherein the identification comprises:

calculating which bits in the bloom filter would have to be set if each of the nodes identified in the store is in the plurality, wherein the calculating comprises looking up identifiers in the maintained store; and checking for the presence of the calculated set bits in the bloom filter.

54. A method according to any of clauses 47 to 53, wherein the encoded information was generated according to a deterministic process by a node in the cluster prior to receipt of the update request in relation to a previously requested function replica creation process.

55. A method according to any of clauses 47 to 54, wherein the nodes on which respective replicas of the given function were configured were first determined by a first node in the cluster prior to receipt of the update request in relation to a previously requested function replica creation process according to a deterministic process on the basis of the given function identifier and the nodes which the first node believed were in the cluster at the time of the function replica creation process, and wherein the probabilistic set used by the first node to encode the first determined nodes comprises a first bloom filter.

56. A method according to clause 55, the method comprising:

second determining the nodes on which respective replicas of the given function are to be updated according to the deterministic process on the basis of the given function identifier and the nodes which the given node believes are in the cluster at the time of receipt of the update request;

generating a second bloom filter to encode the second determined nodes;

comparing the first bloom filter to the second bloom filter; and in response to the comparison indicating at least one discrepancy between the first determined nodes and the second determined nodes, transmitting at least one further replica function update message to at least one further node to instruct update of its configured replica of the given function according to the update requested by the client.

57. A method according to clause 56, wherein the first determined nodes comprises the at least one further node.

58. A method according to clause 56 or 57, comprising notifying the client of the second bloom filter.

59. A method according to any of clauses 54 to 58, wherein the function replica creation process was carried out by the given node.

60. A method according to any of clauses 54 to 59, wherein the function replica creation process was carried out by a different node to the given node in the cluster.

61. A method according to any of clauses 54 to 60, wherein the function replica creation process was previously requested by a different client to the client requesting the update request.

62. A method according to any of clauses 47 to 61, wherein the given function comprises a timer function.

63. A method according to clause 62, wherein the popping of the timer function comprises initiating callback of a client by the respective configured replica.

64. A method according to any of clauses 47 to 63, wherein the update request comprises a request to apply one or more changes to an existing given function configured on the plurality of nodes.

65. A method according to any of clauses 47 to 64, wherein the update request comprises a request to delete an existing given function configured on the plurality of nodes.

66. A method according to clauses 62 and 64, wherein the one or more changes relates to one or more of the following in relation to the timer function:

a different configured pop time, a different number of configured replicas, and a different number of configured recurrences.

67. A method according to any of clauses 47 to 66, wherein the identification further comprises identifying at least one node in the cluster of nodes on which a replica of the given function has not been configured, and the transmittal further comprises transmitting a replica update message to the at least one node in the cluster which is not in the plurality.

68. A method according to any of clauses 47 to 67, wherein the client from which the update request was received is co-located with the given node.

69. A method according to any of clauses 47 to 67, wherein the client from which the update request is located remotely from the given node.

70. A method according to any of clauses 47 to 69, wherein the encoded information comprises 64 bits.

71. A method according to clause 70, wherein the given function identifier comprises a 64 bit number and the 64 bit encoded information.

72. Apparatus for use in identifying nodes in a network, the network comprising a cluster of nodes which are responsible for providing replicas of functions for clients in the network, the apparatus being configured to, at a given node in the cluster:

receive, from a client, a request to apply an update to a given function configured as replicas of the given function on a plurality of nodes in the cluster, the update request comprising an identifier for the given function, the given function identifier comprising information encoded using a probabilistic set, the information being associated with each of the nodes in the plurality of nodes on which the given function has been configured;

decode the encoded information to identify each of the nodes in the plurality of nodes on which respective replicas of the given function have been configured; and transmit at least one replica function update message to one or more of the identified nodes to instruct update of their respective configured replicas of the given function according to the update requested by the client.

73. A computer program adapted to perform a method of identifying nodes in a network, the network comprising a cluster of nodes which are responsible for providing replicas of functions for clients in the network, the method comprising, at a given node in the cluster:

receiving, from a client, a request to apply an update to a given function configured as replicas of the given function on a plurality of nodes in the cluster, the update request comprising an identifier for the given function, the given function identifier comprising information encoded using a probabilistic set, the information being associated with each of the nodes in the plurality of nodes on which the given function has been configured;

decoding the encoded information to identify each of the nodes in the plurality of nodes on which respective replicas of the given function have been configured; and transmitting at least one replica function update message to one or more of the identified nodes to instruct update of their respective configured replicas of the given function according to the update requested by the client.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of identifying nodes in a network, the network comprising a cluster of nodes for clients in the network, the method comprising:

receiving, by a given node in the cluster, from a client, an update request to apply an update to a given function configured as respective replicas of the given function on a plurality of nodes in the cluster, the update request comprising an identifier for the given function, the identifier for the given function comprising information encoded using a probabilistic set, the encoded information being associated with the plurality of nodes on which the given function has been configured;

decoding, by the given node, the encoded information to identify the plurality of nodes on which the respective replicas of the given function have been configured;

transmitting, by the given node, at least one replica function update message to one or more nodes of the plurality of nodes to instruct update of configured replicas of the given function of the one or more nodes according to the update request by the client;

determining, by a first node in the cluster, first determined nodes, on which replicas of the given function were configured, prior to receipt of the update request in relation to a previously requested function replica creation process, according to a deterministic process on basis of the identifier for the given function and nodes which the first node believed were in the cluster at a time of the function replica creation process, wherein the probabilistic set used by the first node to encode the first determined nodes comprises a first bloom filter;

determining, by the given node, second determined nodes, on which replicas of the given function are to be updated, according to a deterministic process on basis of the identifier for the given function and nodes which the given node believes are in the cluster at a time of the receipt of the update request;

generating a second bloom filter to encode the second determined nodes;

comparing the first bloom filter to the second bloom filter; and in response to the comparison indicating at least one discrepancy between the first determined nodes and the second determined nodes, transmitting at least one further replica function update message to at least one further node to instruct update of a configured replica of the given function of the at least one further node according to the update request by the client.

2. A method according to claim 1, wherein the first bloom filter produces a positive response when queried for a presence of a predetermined identifier for any of the plurality of nodes.

3. A method according to claim 1, comprising generating the first bloom filter by:

for each of the plurality of nodes, generating a replica-specific bloom filter on basis of an identifier for each of the plurality of nodes; and performing a binary OR operation between the replica-specific bloom filter generated for each of the plurality of nodes.

4. A method according to claim 3, wherein generating a replica-specific bloom filter for a second node in the plurality of nodes comprises performing a hashing operation on a predetermined identifier for the second node.

5. A method according to claim 1, comprising maintaining a store of stored identifiers for stored nodes that the given node believes are currently in the cluster, and comparing the decoded information with the stored identifiers in the store.

6. A method according to claim 5, comprising:

calculating which bits in the first bloom filter would have to be set if each of the stored nodes identified in the store is in the plurality of nodes, wherein the calculating comprises looking up identifiers in the store; and checking for a presence of the calculated set bits in the first bloom filter.

7. A method according to claim 1, wherein the first determined nodes comprises the at least one further node.

8. A method according to claim 1, comprising notifying a client of the second bloom filter.

9. A method according to claim 1, wherein the function replica creation process was carried out by the given node.

10. A method according to claim 1, wherein the function replica creation process was carried out by a different node to the given node in the cluster.

11. A method according to claim 1, wherein the function replica creation process was previously requested by a different client, to the client from which the update request was received.

12. A method according to claim 1, wherein the given function comprises a timer function.

13. A method according to claim 12, wherein a popping of the timer function comprises initiating callback of a client by a respective configured replica.

14. A method according to claim 1, wherein the update request comprises a request to apply one or more changes to an existing given function configured on the plurality of nodes.

15. A method according to claim 14, wherein the given function comprises a timer function, and the one or more changes relate to one or more of the following in relation to the timer function:

a different configured pop time, a different number of configured replicas, and a different number of configured recurrences.

16. A method according to claim 1, wherein the update request comprises a request to delete an existing given function configured on the plurality of nodes.

17. A method according to claim 1, further comprising identifying at least one node in the cluster of nodes on which a replica of the given function has not been configured, and transmitting a replica update message to the at least one node in the cluster which is not in the plurality of nodes.

18. A method according to claim 1, wherein the client from which the update request was received is co-located with the given node.

19. A method according to claim 1, wherein the client from which the update request was received is located remotely from the given node.

20. A method according to claim 1, wherein the encoded information comprises 64 bits encoded information.

21. A method according to claim 20, wherein the identifier for the given function comprises a 64-bit number and the 64-bit encoded information.

22. A system, of identifying nodes in a network, the network comprising a cluster of nodes for clients in the network, the system comprising:

non-transitory memory and one processor to perform:

receive, by a given node in the cluster, from a client, an update request to apply an update to a given function configured as respective replicas of the given function on a plurality of nodes in the cluster, the update request comprising an identifier for the given function, the identifier for the given function identifier comprising information encoded using a probabilistic set, the encoded information being associated with the plurality of nodes on which the given function has been configured;

decode, by the given node, the encoded information to identify the plurality of nodes on which the respective replicas of the given function have been configured;

transmit, by the given node, at least one replica function update message to one or more nodes of the plurality of nodes to instruct update of configured replicas of the given function of the one or more nodes according to the update request by the client;

determining, by a first node in the cluster, first determined nodes, on which replicas of the given function were configured, prior to receipt of the update request in relation to a previously requested function replica creation process, according to a deterministic process on basis of the identifier for the given function and nodes which the first node believed were in the cluster at a time of the function replica creation process, wherein the probabilistic set used by the first node to encode the first determined nodes comprises a first bloom filter;

determining, by the given node, second determined nodes, on which replicas of the given function are to be updated, according to a deterministic process on basis of the identifier for the given function and nodes which the given node believes are in the cluster at a time of the receipt of the update request;

generating a second bloom filter to encode the second determined nodes;

comparing the first bloom filter to the second bloom filter; and in response to the comparison indicating at least one discrepancy between the first determined nodes and the second determined nodes, transmitting at least one further replica function update message to at least one further node to instruct update of a configured replica of the given function of the at least one further node according to the update request by the client.

23. A non-transitory computer readable medium storing instructions that, when executed by one processor, perform a method of identifying nodes in a network, the network comprising a cluster of nodes for clients in the network, the method comprising:

receiving, by a given node in the cluster, from a client, an update request to apply an update to a given function configured as respective replicas of the given function on a plurality of nodes in the cluster, the update request comprising an identifier for the given function, the identifier for the given function comprising information encoded using a probabilistic set, the encoded information being associated with the plurality of nodes on which the given function has been configured;

decoding, by the given node, the encoded information to identify the plurality of nodes on which the respective replicas of the given function have been configured;

transmitting, by the given node, at least one replica function update message to one or more nodes of the plurality of nodes to instruct update of configured replicas of the given function of the one or more nodes according to the update request by the client;

determining, by a first node in the cluster, first determined nodes, on which replicas of the given function were configured, prior to receipt of the update request in relation to a previously requested function replica creation process, according to a deterministic process on basis of the identifier for the given function and nodes which the first node believed were in the cluster at a time of the function replica creation process, wherein the probabilistic set used by the first node to encode the first determined nodes comprises a first bloom filter;

determining, by the given node, second determined nodes, on which replicas of the given function are to be updated, according to a deterministic process on basis of the identifier for the given function and nodes which the given node believes are in the cluster at a time of the receipt of the update request;

generating a second bloom filter to encode the second determined nodes;

comparing the first bloom filter to the second bloom filter; and in response to the comparison indicating at least one discrepancy between the first determined nodes and the second determined nodes, transmitting at least one further replica function update message to at least one further node to instruct update of a configured replica of the given function of the at least one further node according to the update request by the client.

* * * * *